US012609837B2

(12) United States Patent
Dubeau et al.

(10) Patent No.: US 12,609,837 B2
(45) Date of Patent: Apr. 21, 2026

(54) TECHNOLOGIES FOR AUDITING AND MAINTAINING ACCESS TO PROTECTED DATA

(71) Applicant: BARLEA CORPORATION, Bothell, WA (US)

(72) Inventors: Daniel J. Dubeau, Bothell, WA (US); Lawrence Richard Jones, Mapleton, UT (US); Samuel William Nathan, Longview, WA (US)

(73) Assignee: BARLEA CORPORATION, Bothell, WA (US)

( * ) Notice: Subject to any disclaimer, the term of this patent is extended or adjusted under 35 U.S.C. 154(b) by 57 days.

(21) Appl. No.: 18/895,998

(22) Filed: Sep. 25, 2024

(65) Prior Publication Data

US 2025/0023744 A1 Jan. 16, 2025

Related U.S. Application Data

(62) Division of application No. 17/375,198, filed on Jul. 14, 2021, now Pat. No. 12,120,243.

(51) Int. Cl.
  H04L 9/32 (2006.01)
  H04L 9/00 (2022.01)
(52) U.S. Cl.
  CPC .......... H04L 9/3247 (2013.01); H04L 9/3213 (2013.01); H04L 9/3236 (2013.01); H04L 9/50 (2022.05); H04L 2209/56 (2013.01)
(58) Field of Classification Search
  CPC ... H04L 9/3247; H04L 9/3213; H04L 9/3236; H04L 9/50
  See application file for complete search history.

(56) References Cited

U.S. PATENT DOCUMENTS

| | | | |
|---|---|---|---|
| 10,826,703 | B1 | 11/2020 | Shipley |
| 2004/0015585 | A1 | 1/2004 | McBrearty et al. |
| 2012/0158955 | A1 | 6/2012 | Kim et al. |
| 2017/0272248 | A1 | 9/2017 | Ozzie |

(Continued)

FOREIGN PATENT DOCUMENTS

| | | |
|---|---|---|
| WO | WO-2018/126029 A2 | 7/2018 |
| WO | WO-2019/036804 A1 | 2/2019 |

OTHER PUBLICATIONS

Di Graski, "When Might Blockchain Appear in Your Court?" Trends in State Courts 2018, p. 62-66.

(Continued)

*Primary Examiner* — Vance M Little
(74) *Attorney, Agent, or Firm* — MARSHALL, GERSTEIN & BORUN LLP

(57) ABSTRACT

Systems and methods for enabling auditing access to protected data stored at a data service using smart contracts on a blockchain are disclosed. According to certain aspects, a compliance management system may maintain and update a public blockchain with transaction indicative of non-compliance events associated with access to the protected data. Auditors or other third parties may access the public blockchain to audit the access to the protected data. Additionally, the compliance management system may implement a private blockchain to manage access restrictions to the protected data and process data requests for the protected data.

20 Claims, 8 Drawing Sheets

(56) References Cited

U.S. PATENT DOCUMENTS

| | | | |
|---|---|---|---|
| 2018/0060496 A1 | 3/2018 | Bulleit et al. | |
| 2018/0083786 A1* | 3/2018 | Dierks | H04L 9/3297 |
| 2018/0096175 A1 | 4/2018 | Schmeling et al. | |
| 2018/0337771 A1 | 11/2018 | Baker et al. | |
| 2019/0281465 A1* | 9/2019 | Moshir | H04M 3/42221 |
| 2020/0118120 A1* | 4/2020 | Hing | G06F 16/27 |
| 2020/0272619 A1* | 8/2020 | Alferov | H04L 9/3239 |
| 2021/0319353 A1* | 10/2021 | Sarpatwar | H04L 9/3297 |

OTHER PUBLICATIONS

Gcn.com, GCN—Industry Insight, "How blockchain can improve public safety," Apr. 17, 2019. Retrieved from the Internet on Jun. 25, 2019: https://gcn.com/Articles/2019/04/17/blockchain-public-safety.aspx?Page=2&p=1.
International Application No. PCT/US2020/041561, International Search Report and Written Opinion, mailed Oct. 21, 2020.
Link.springer.com—"The genesis of the European Union's new proposed legal instrument(s) on e-evidence". Published: Sep. 3, 2018. Retrieved from the Internet: https://link.springer.com/article/10.1007/s12027-018-0525-4.
Ryu et al., A blockchain-based decentralized efficient investigation framework for IoT digital forensics, J. Supercomputing, 73:4372-87 (Feb. 15, 2019).

* cited by examiner

400

VALIDATE NEW PARTICIPANT REQUEST        402

GENERATE CREDENTIALS FOR NEW PARTICIPANT        404

GENERATE AUTHORIZATION FORMS        406

VALIDATE RECEIVED FORMS        408

STORE PARTICIPANT DATA        410

UPDATE PUBLIC BLOCKCHAIN        412

500

RECEIVE RECORDS FOR STORAGE — 502

AUTHENTICATE CUSTODIAN AND DATA OWNER — 504

VERIFY AUTHORIZATION OF CUSTODIAN — 506

RECORD DATA — 508

UPDATE PUBLIC BLOCKCHAIN — 510

600

602 RECEIVE DATA REQUEST

604 UPDATE SMART CONTRACT TRANSACTION

606 TRANSMIT FULFILLMENT REQUEST

608 RECEIVE REQUESTED DATA

610 PROVIDE REQUESTED DATA TO REQUESTOR

612 DETERMINE COMPLIANCE FOR DATA REQUEST

614 UPDATE SMART CONTRACT WITH COMPLIANCE DETERMINATION

616 CREATE NON-COMPLIANCE TRANSACTION IN PUBLIC DISTRIBUTED LEDGER

700

RECEIVE BATCH OF DATA TRANSACTIONS 702

AUTHENTICATE DATA TRANSACTIONS 704

DETERMINE COMPLIANCE OF DATA TRANSACTIONS 706

DETECT A PARTICULAR DATA TRANSACTION IS NON-COMPLIANT 708

CREATE NON-COMPLIANCE TRANSACTION ON PUBLIC DISTRIBUTED LEDGER 710

TECHNOLOGIES FOR AUDITING AND MAINTAINING ACCESS TO PROTECTED DATA

CROSS-REFERENCE TO RELATED APPLICATIONS

This application is a divisional of U.S. patent application Ser. No. 17/375,198 entitled "Technologies for Auditing and Maintaining Access to Protected Data," filed on Jul. 14, 2021, the entire contents of which is hereby expressly incorporated herein by reference.

FIELD

The present disclosure is directed to blockchain technologies. More particularly, the present disclose is directed to platforms, components, and techniques for using smart contract transactions on a blockchain to audit and/or monitor access to protected data.

BACKGROUND

Many types of consumer data are subject to access restrictions. For example, only authorized personnel are able to access protected health information (PHI) associated with patient medical information. As another example, payment card industry (PCI) security standards limit whom can access consumer credit card information. As such, data services that manage protected data need access rights systems to ensure only authorized entities access or otherwise interact with the protected data.

Blockchain technology has become a popular technology for storing many types of data due to the decentralized, immutable, and secure nature of the underlying technology. However, when data service providers implement blockchain technology to store protected data, there are increased risks of unauthorized persons inappropriately accessing protected data. Without proper systems in place, it is difficult for the data service providers and the corresponding data owners of the protected data to know when the protected data has been inappropriately accessed or access has been inappropriately denied. Accordingly, there is an opportunity for systems and methods to monitor and audit access to protected data maintained by data services.

DETAILED DESCRIPTION

Figure 1:
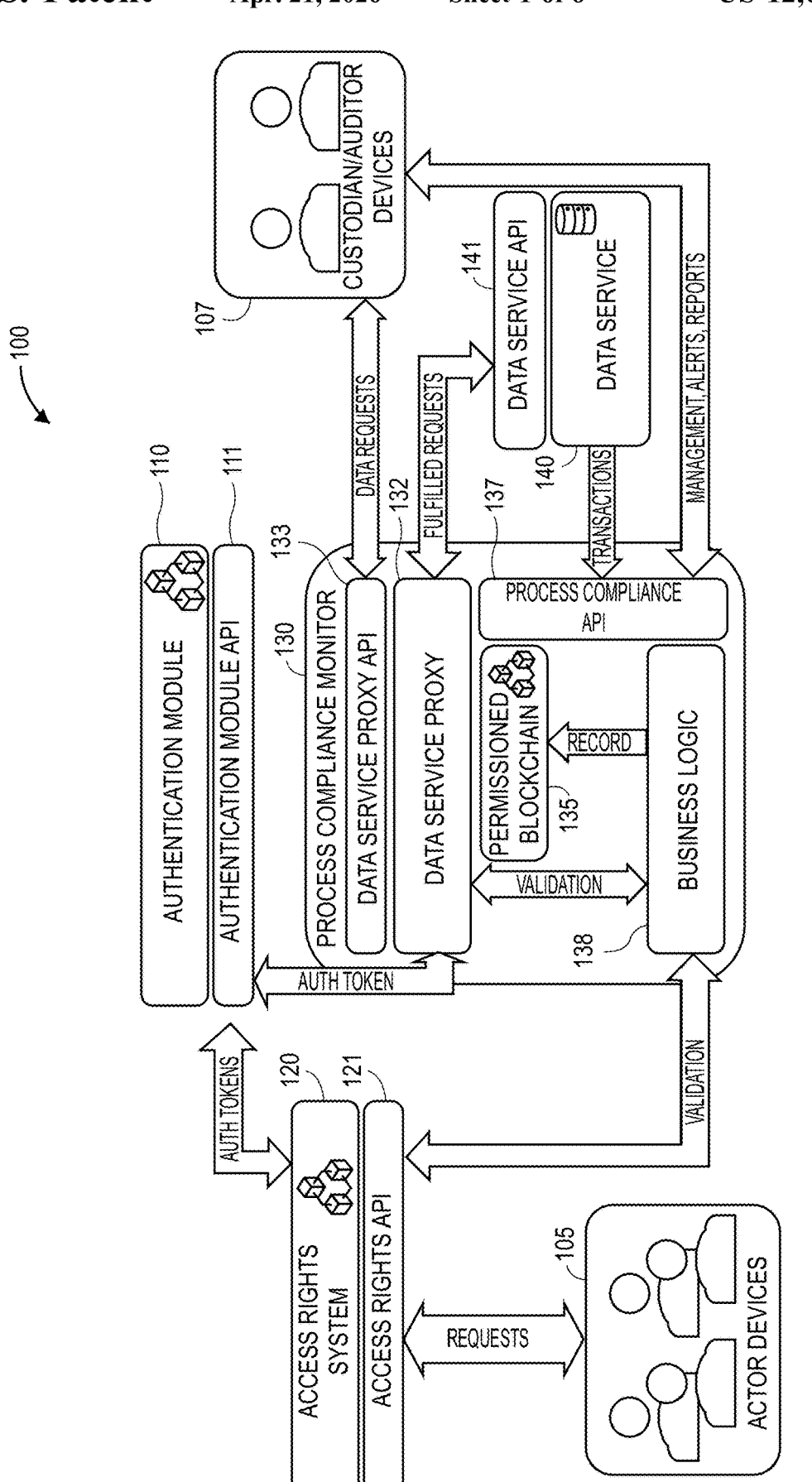
FIG. 1 depicts an overview of components and entities associated with the systems and methods, in accordance with some embodiments.

According to the present embodiments, systems and methods to monitor and audit access to protected data maintained by data services are described. The systems and methods are intended to provide a transparent ledger of access to protected data to identify potential violations of associated laws and regulations. Accordingly, auditors and persons associated with protected data can readily determine whether protected data has been inappropriately accessed. In some embodiments, the systems and methods prevent unauthorized access before it occurs. As such, the systems and methods also improve data privacy protections for various types of confidential data.

According to certain aspects, the systems and methods provide a unified ledger of events associated with protected data access. To this end, in conventional data management systems, the cascading permissions between data owners, data custodians, secondary custodians, and other actors result is disparate data stores that are accessed by a portion of the parties. As such, in these conventional systems, an auditor determining compliance with access regulations needs access to each data store in order to complete the audit. On the other hand, the systems and methods provide a single ledger that the auditor can access to view the required access events to complete the audit. This improves the likelihood that the auditor is able to review the complete set of access events and provide a more accurate audit of access to protected data.

According to certain aspects, the systems and methods are also able to detect a non-compliance event associated with an absence of an expected authorized access of protected data. For example, a patient may authorize a medical testing facility to upload test results to a data service and for a specialist to view the test results to provide their analysis to the patient. The systems and methods may detect whether the medical testing facility failed to upload the test result facility and/or whether the specialist failed to access the test results within a predetermined time period. Additionally, the systems and methods may detect whether the medical testing facility and/or the specialist were inappropriately denied access to the patient's protected data. Accordingly, the systems and methods also relate to providing data owners notice of non-compliance associated with a failure to access protected data in an expected manner. It should be appreciated that additional benefits are envisioned.

While example embodiments provided herein generally relate to protected health information (PHI), the systems and methods described herein can be adapted to a variety of other contexts. For example, the systems and methods disclosed herein may be implemented to monitor and audit access to secured research and development data, to government records associated with security clearances and/or other safeguards (including those related to congressional oversight), to payment card industry (PCI) covered data, to reservation systems for transportation systems (e.g., aircraft or train passenger name record (PNR) systems), and/or other data services that store protected and/or confidential data.

FIG. 1 illustrates an overview of a system 100 of components configured to facilitate the systems and methods. It should be appreciated that the system 100 is merely an example and that alternative or additional components are envisioned. The components included in the system 100 communicate with one another for the indicated purposes using any type of data communication via any standard or technology including various wide area network or local area network protocols (e.g., GSM, CDMA, VoIP, TDMA, WCDMA, LTE, EDGE, OFDM, GPRS, EV-DO, UWB, Internet, IEEE 802 including Ethernet, WiMAX, Wi-Fi, Bluetooth, and others). It should be appreciated that some communication links between the illustrated components of the system 100 may utilize different technology and/or standards than other communication links of the system 100.

As illustrated in FIG. 1, the system 100 may include actor device 105 that may be associated with an individual (e.g., a patient) or an entity (e.g., a company) that owns protected data. Similarly, the system 100 includes custodian/auditor devices 107. The actor device 105 and the custodian/auditor devices 107 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like.

The system 100 includes a data service 140 via which protected data is stored. For example, the data service 140 may be configured to store a plurality of electronic medical records (EMR). The data service 140 may include the data storage components (e.g., databases, memories, cloud storage systems, distributed ledgers) and front-end components that manage access to the stored data (e.g., servers, database managers, cloud computing components). In some embodiments, the data stored via the data service 140 is maintained in a blockchain or another type of distributed ledger. As illustrated, the front-end components of the data service 140 support an application programming interface (API) 141 via which external components interact with the data service 140, for example, to access or store data thereat.

To unify access to the data service 140, the system 100 includes a process compliance monitor (PCM) 130 configured to act as interface between the data service 140 and the actor device 105 and/or custodian/auditor devices 107. To this end, the PCM 130 includes a proxy 132 for the data service 140. As the name indicates, the proxy 132 is the component via which requests to store or access data maintained at the data service 140 are received. More particularly, the proxy 132 includes an API 133 via which external components, such as the custodian devices 107, submit requests to interact with the data maintained by the data service 130. To this end, an application executing on the custodian devices 107 may store a set of API calls corresponding to the proxy API 133 such that the data requests from the custodian devices 107 are formatted in a manner that is interpretable by the proxy 132 to cause the proxy 132 to perform the requested task. More particularly, when the proxy 132 receives a properly formatted request via the proxy API 133, the proxy 132 generates a corresponding request formatted in accordance with API 141 of the data service 140. For requests related to retrieve and/or accessing data stored at the data service 140, the data service 140 may respond by transmitting the requested data to the proxy 132 which, in turn, transmits the request data to the custodian device 107. Similarly, for requests to write or modify data stored at the data service 140, the data service 140 may respond by transmitting an indication that the write or modify command was successfully performed to the proxy 132, which, in turn, transmits the indication to the custodian device 107.

According to certain aspects, the PCM 130 and/or the proxy 132 thereof is a node (or a collection of nodes) of a private blockchain network (not depicted). According to embodiments, the set of node computers that form the private blockchain network may represent a decentralized database where each of the set of node computers store and update a copy of a ledger on which blockchain transactions may be initiated and stored. As changes are made to the ledger, each node computer receives the change via the private blockchain network and updates its respective copy of the shared ledger. A consensus mechanism may be used by the set of node computers to decide whether it is appropriate to make received changes to the ledger. Each node computer therefore has its own copy of the ledger, which is identical to every other copy of the ledger stored by the other node computers. The shared ledger implementation is more robust than a central authority database system because of the shared ledger's decentralized nature. As such, there is no single point of failure on the shared ledger as there would be in a centralized system.

To process the requests received via the proxy API 133, the data proxy 132 may be configured to create a smart contract on the private blockchain. As is understood by those skilled in the art, smart contracts are a set of logic that includes self-executing actions when defined events occur. For example, the actions may include facilitating, verifying, and/or enforcing the negotiation or performance of a contract, where the smart contracts are trackable and irreversible. In the instant example, a contract may represent a request to access, retrieve, write, or modify data maintained at the data service 140. As such, the executable instructions for validating, executing, and providing an auditable repository of information associated with the request may be defined by the smart contract maintained on the private blockchain of the PCM 130.

According to aspects, the PCM 130 also interfaces with a public blockchain 135 that acts as the public-facing compliance log. Unlike the private blockchain used to process data requests and manage access restrictions, the data maintained on the public blockchain 135 is intended to be viewable by authorized third parties, such as the auditor devices 107. According to certain aspects, the PCM 130 includes a set of business logic 138 that defines whether or not a data request received via the proxy API 133 is compliant with relevant rules, regulations, and/or data-owner defined access restrictions. To this end, the business logic 138 may act upon the data maintained on the private blockchain and/or the smart contracts to validate compliance of the data requests received via the proxy API 133. In some embodiments, the smart contracts on the private blockchain trigger the business logic 138 act thereupon. For example, the smart contract may trigger the business logic 138 to act thereupon prior to sending the data request to the interface 141 to prevent the unauthorized access from occurring. As another example, the smart contract may trigger the business logic 138 to act thereupon before or after fulfilling the data request with the data service 140 to passively maintain the compliance log. In other embodiments, the batches of transactions performed by the data service 140 are periodically sent to the PCM 130 for analysis by the business logic 138. Based upon the analysis, the business logic 138 records a transaction on the public blockchain 135 indicating whether the request received via the proxy API 133 and/or the transaction performed by the data service 140 is compliant with the relevant rules, regulations, and/or data-owner defined access restrictions. Specific examples of non-compliant access of the data service 140 will be described below.

The PCM 130 also includes a process compliance API 137 via which third parties, such as the auditor devices 107, access the public blockchain 135. For example, when the auditor wants to conduct an audit, the process compliance API 137 may enable the auditor device 107 to transmit an API call for all transactions (or all non-compliant transactions) that occurred within a defined time period. As another example, the process compliance API 137 may be configured to analyze the public blockchain 135 to periodically generate and transmit a compliance report to registered auditor devices 107. Accordingly, the process compliance API 137 may be configured to maintain a subscriber list of auditor devices 107. In some embodiments, the subscriber list is maintained as a transaction on the private blockchain and the compliance reports are distributed via a compliance report smart contract transaction on the public blockchain 135. As yet another example, the process compliance API 137 maybe configured to analyze the public blockchain 135 and generate and transmit an alert to registered auditor devices 135 when a non-compliant transaction is detected. Accordingly, the process compliance API 137 may also enable authorized auditor devices 107 to register with the PCM 130 to receive the reports and/or alerts. It will be appreciated that the process compliance API 137 may be configured to support other management actions related to tracking compliance of access to data stored with the data service 140. For example, the process compliance API 137 may also periodically request that the data service 140 provides batches of data transactions performed thereat to the PCM 130.

As illustrated, the system 100 also includes an access rights system 120 via which actors define usage rights for their protected data. Accordingly, the access rights system 120 may be a server or other computing device communicatively coupled to the actor devices 105. One example of an access rights system are the blockchain components and/or node computers described in U.S. patent application Ser. No. 16/926,362, the entire disclosure of which is hereby incorporated by reference. In some embodiments, the access rights system 120 is a node of the private blockchain associated with the PCM 130. The access rights system 120 includes an API 121 via which external components, such as the actor devices 105, submit requests to define access rights associated with their protected data. For example, the API 121 may enable actors to authorize a healthcare provider (HCP) to access and record data to their EMR. The access rights and/or restrictions defined via the access rights system 120 may be maintained as part of an access rights or permissions smart contract on the private blockchain. In some embodiments, the access rights defined via the API 121 are associated with expiration timers which, upon expiration, causes the access rights provided by the actor to be revoked. To revoke the access rights, the access rights system 120 may delete an authentication token associated with the access rights from the access rights smart contract. Accordingly, when the business logic 138 of the PCM 130 is configured to confirm compliance with user-defined access rights, the business logic 138 may cause the PCM 130 to query the appropriate set of user-defined access rights maintained by the access rights system 120.

The system 100 also includes an authentication module 110 for managing authentication tokens for the blockchains disclosed herein and for synchronizing authentication across the various computing systems described herein. The authentication module 110 may be a server or other computing device and, in some embodiments, is a node of the private blockchain associated with the PCM 130. As illustrated, the authentication module 110 includes an API 111 via which the authentication functionality is invoked. For example, when a new actor registers with the access rights system 120, the access rights system 120 may interface with the API 111 to issue the new actor an authentication token. As another example, when an actor device 105 and/or a custodian/auditor device 107 sends a requests, the device may append an authentication token to the request. Accordingly, when the access rights system 120 and/or the proxy 132 receives a request, the access rights system 120 and/or the proxy 132 may validate that the token included in the request is the proper token for the requesting party. In some embodiments, this validation occurs using known public/private key encryption techniques.

According to certain aspects, the access rights system 120 may also interface with the authentication module 110 to generate an authentication token for a specific request. For example, if a patient requests that a HCP is provided access to EMR maintained at the data service 140, the access rights system 120 may cause a smart contract corresponding to the request to be created and stored on the private blockchain. The compliance server 120 may then invoke the authentication API 111 to generate an authentication token corresponding to the smart contract and provide the token to the actor device 105. The patient may then provide or otherwise authorize (e.g., via a portal supported by components of the system 100) the HCP to utilize the authentication token when interacting with data related to the smart contract.

It should be understood that FIG. 1 illustrates the logical arrangement of the components of the system 100. In some embodiments, multiple components of the system 100 are implemented in a single physical computing system (e.g., any number of authentication module 110, the access rights system 120, and the PCM 130 may be implemented at the same server or cloud computing environment). Nonetheless, when the components are implemented at the same physical component, the components may still interact with each other via the illustrated APIs.

Figure 2A:
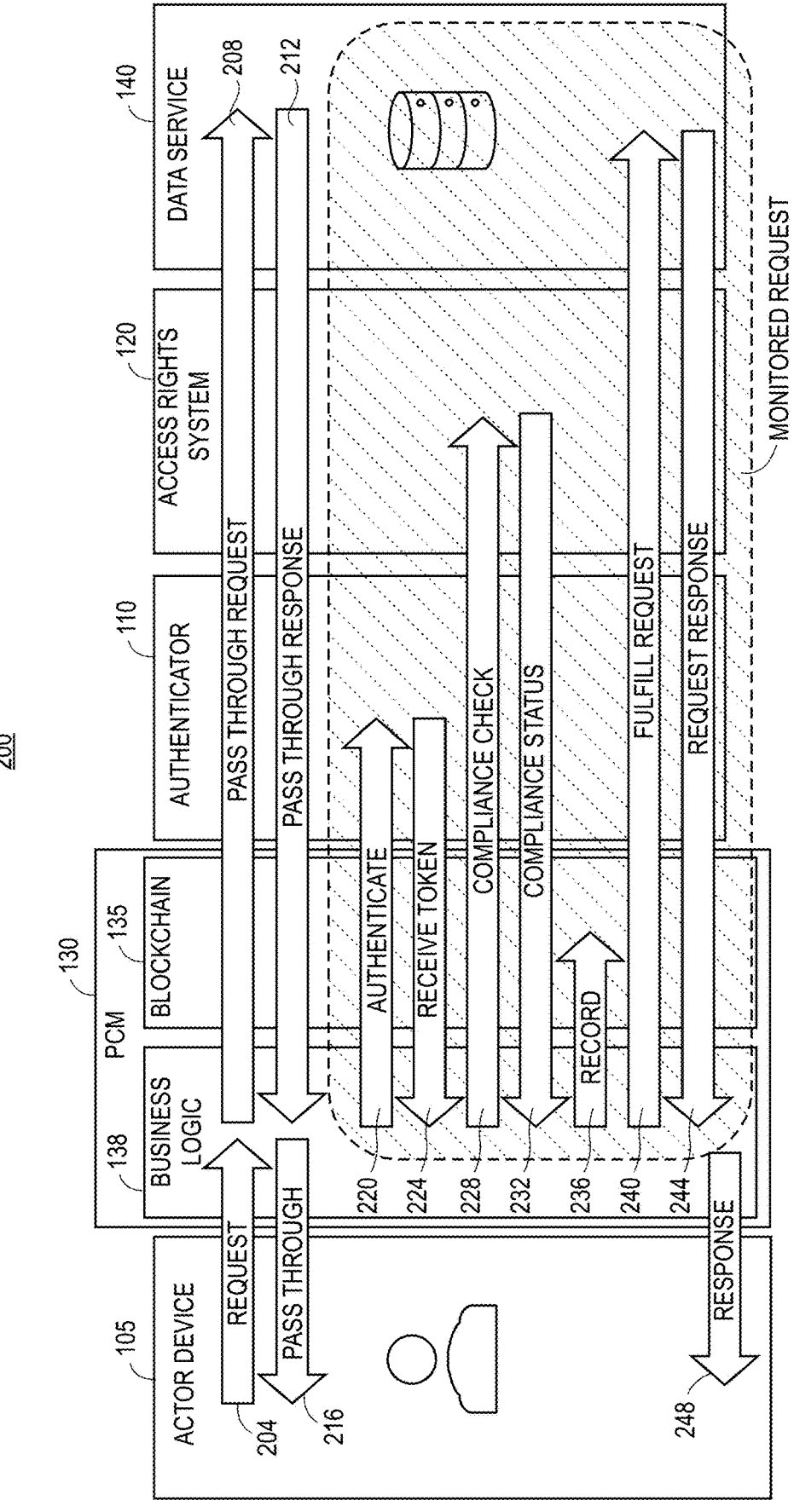
FIGS. 2A and 2B depict signal diagrams of certain components and functionalities associated therewith, in accordance with some embodiments.

FIG. 2A depicts a signal diagram 200 of various devices, components, and entities, and communications therebetween associated with the systems and methods. The signal diagram 200 may include the following device or components: the actor device 105, the PCM 130, the authentication module 110, the access rights system 120, and the data service 140. It should be appreciated that the various signals communicated between the depicted components may be formatted in accordance with an API of the receiving component. Additionally, portions of the business logic 138 may be implemented in the form of a smart contract transaction on the private blockchain. Generally, the signal diagram 200 relates to determining compliance for requests for data stored at the data service 140. In particular, the signal diagram 200 depicts the processing for a request received from the data owner (steps 204-216) and a request received from a third party, such as a data custodian (steps 220-248).

The signal diagram 200 begins when the actor device 105 requests (204) data stored at the data service 140. More particularly, the actor device 105 sends the request to the proxy 132 of the PCM 130 which validates the request via the business logic 138. In the illustrated scenario, the business logic 138 may include a rule that an actor is to be provided access to their own data maintained at the data service 140. Accordingly, the PCM 130 forwards (208) the request on to the data service 140 for fulfillment. In some embodiments, the PCM 130 may authenticate the actor device 105 prior to forwarding the request to the data service 140.

In response to receiving the request, the data service 140 analyzes and fulfills the data request. In the illustrated scenario, the request is to retrieve data stored at the data service 140. Accordingly, the data service 140 sends (212) the requested data to the proxy 132 of the PCM 130. The business logic 138 of the PCM 130 correlates the response from the data service 140 with the request received from the actor device 105 and transmits (216) the requested data to the actor device 105.

Turning now to the process for when a third party, such as a data custodian, requests access to data maintained at the data service 140 for the actor, the PCM 130 may create a smart contract transaction on the private blockchain for processing the received data request. The processing begins when the business logic 138 of the PCM 130 authenticates (220) the request. According to certain aspects, the various applications and software components end users interact with may include different credential systems than those used for controlling access to the data stored via the data service 140. For example, the third party may log into the system 100 via a web portal using credentials associated with their employer. The authentication module 110 may store a plurality of records that associate the end-user credentials with their corresponding authentication tokens for accessing the data maintained at the data service 140. Accordingly, the authentication request transmitted to the authentication module 110 may include an indication of the end-user account. The authentication module 110 may then analyze the authentication request to retrieve the requestor's authentication token for accessing the data service 140 and transmit (224) it back to the PCM 130.

Upon receiving the authentication token, the PCM 130 may verify whether the actor 105 authorized the third party to access the data maintained at the data service 140. As described above, the access rights system 120 may store a set of user-defined access rights for the actor's data. Accordingly, the business logic 138 may transmit (228) a compliance check to the access rights system 120. The compliance check may include the third party's authentication token and an indication of the actor whose data is being accessed. In response, the access rights system 120 accesses the usage access rights for the indicator actor to determine whether or not the record includes an indication of the third party's authentication token. The access rights system 120 responds (232) to the PCM 130 with the result of the determination which then records (236) the result on the public blockchain 135. More particularly, the business logic 130 may create a transaction that indicates the third-party that made the request, an indication of the authentication token used to make the request, an indication of the requested data, an indication of the data owner, and/or other data that is useful when auditing data access requests.

In the illustrated scenario, the PCM 130 is a passive entity that merely records whether or not the third party request is authorized. Accordingly, in this scenario, regardless of the result, the PCM 130 forwards (240) the data request to the data service 140 for fulfillment. In response, the data service 140 returns (244) the requested data to the PCM 130 which provides the data to the third party. In other embodiments, the PCM 130 may not transmit the fulfillment request at step 240 if the access rights system 120 determines that the request is non-compliant. Regardless, the PCM 130 may transmit (248) a notification to the actor device 105 informing the actor that their data was accessed by the third party requestor.

In still other embodiments, in response to the access rights system 120 determining that the request is non-compliant, the PCM 130 may send a prompt or alert to the actor device 105 via which the actor can permit or deny the third party data request. Accordingly, the prompt or alert may include an indication of the third party requestor and the requested data to provide the actor sufficient information to decide whether or not to permit the data request. If the actor approves the data request, the PCM 130 may proceed with fulfilling the data request via the data service 140 and update the access rights system 120 accordingly. If the actor rejects the data request, the PCM 130 may update the transaction on the public blockchain 135 to indicate that the actor actively rejected the data request.

Figure 2B:
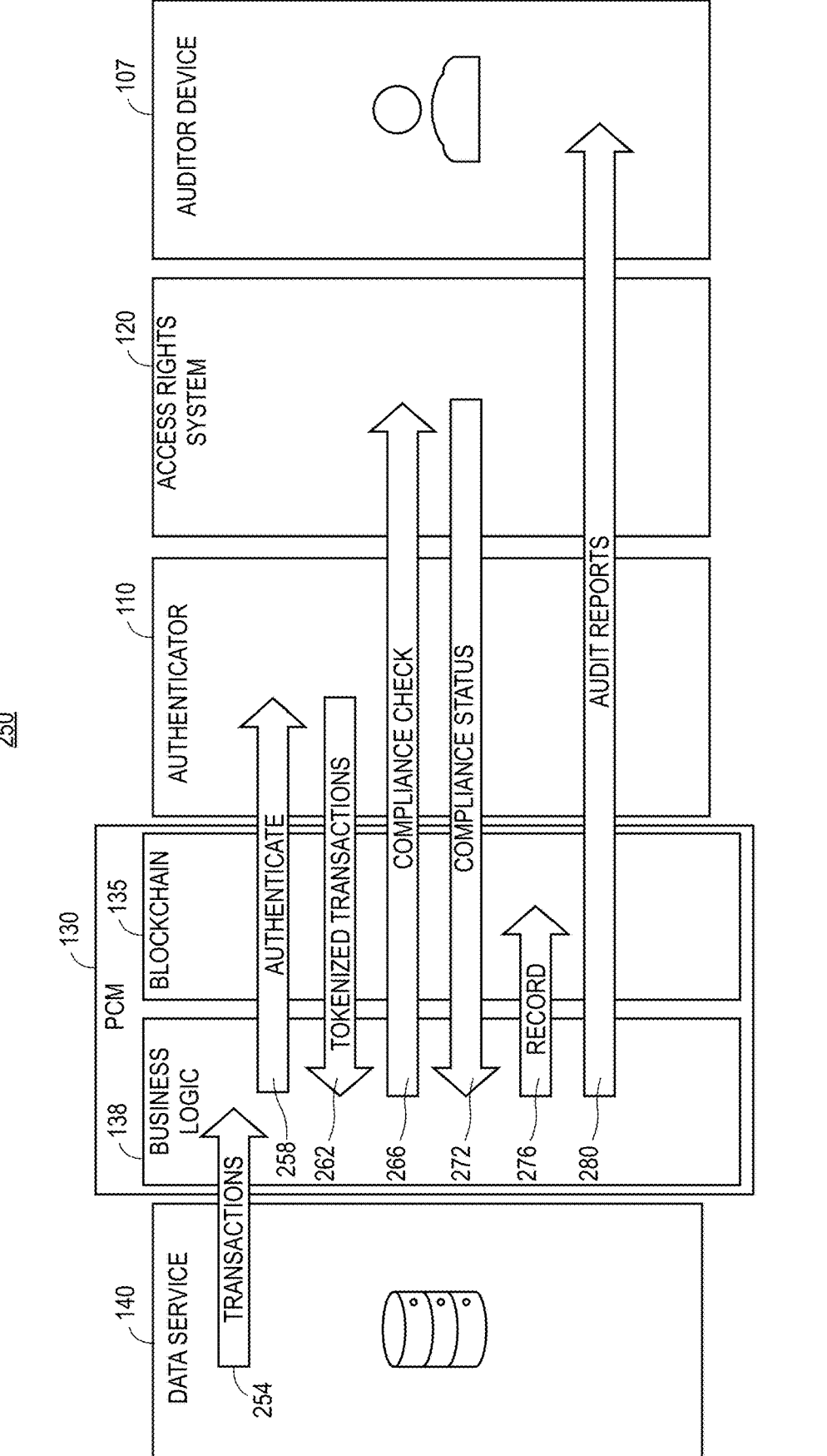

FIG. 2B depicts a signal diagram 250 of various devices, components, and entities, and communications therebetween associated with the systems and methods. The signal diagram 200 may include the following device or components: the auditor device 107, the PCM 130, the authentication module 110, the access rights system 120, and the data service 140. It should be appreciated that the various signals communicated between the depicted components may be formatted in accordance with an API of the receiving component. Additionally, portions of the business logic 138 may be implemented in the form of a smart contract transaction on the private blockchain. Generally, the signal diagram 250 relates to validating batches of data transactions performed by the data service 140 were authorized.

Accordingly, the signal diagram 250 begins when the data service transmits (254) a batch of transactions to the PCM 130 for validation. The data service 140 may be configured to periodically transmit the batches of transactions (e.g., daily, hourly, every 1,000 transactions, etc.). The data transaction included in the batch may indicate a particular operation performed by the data service (e.g., read, write, modify), a data owner for that data acted upon, and a transaction requestor. In some embodiments, the PCM 130 creates a smart contract transaction on the private blockchain for processing the received batch of transactions.

As described herein, the PCM 130 include the proxy 132 that interfaces between an existing data service 140. Thus, the credentialing system used by the data service 140 may not align with the credentialing system of the PCM 130, the authentication module 110, and/or the access rights system 120. As such, the indications of data owners and requestors included in the batch of transactions do not include their corresponding authentication tokens. Accordingly, the PCM 130 may route (258) the batch of transactions to the authentication module 120 to associate the indications of data owners and requestors with their corresponding authentication tokens. In response, the authentication module 120 appends the relevant authentication tokens to the transactions in the batch of transactions and returns (262) the tokenized transactions to the PCM 130 for analysis thereof.

After receiving the tokenized transactions, the PCM 130 sends (266) the transactions to the access rights system 120 to perform a compliance check on each of the transaction. For each tokenized transaction, the access rights system 120 may identify the data owner and determine whether or not the requestor's authentication token is authorized to access the data associated with the transaction. As another example, the access rights system 120 may identify instances where an authorized and authenticated requestor was in appropriately denied access to data maintained with the data service

140. Accordingly, as it is generally used herein, determining whether or not data maintained with the data service 140 is accessed in a compliant manner includes determining that access was not inappropriately denied. The access rights system 120 then returns (272) the compliance status for the tokenized transactions to the PCM 130 such that the PCM 130 can record (276) the compliance data in the public blockchain 135.

As described herein, one or more auditor devices 107 may register with the PCM 130 to receive audit reports for the data service 140. Accordingly, the PCM 130 may be configured to analyze the compliance status for the tokenized transactions to generate a compliance report indicative of how the data maintained at data service 140 was accessed. In particular, the audit report may identify any instances where data maintained at the data service 140 was accessed in an unauthorized manner. After generating the audit reports, the PCM 130 may send (280) the audit reports to any subscribed auditor device 107.

Figure 3:
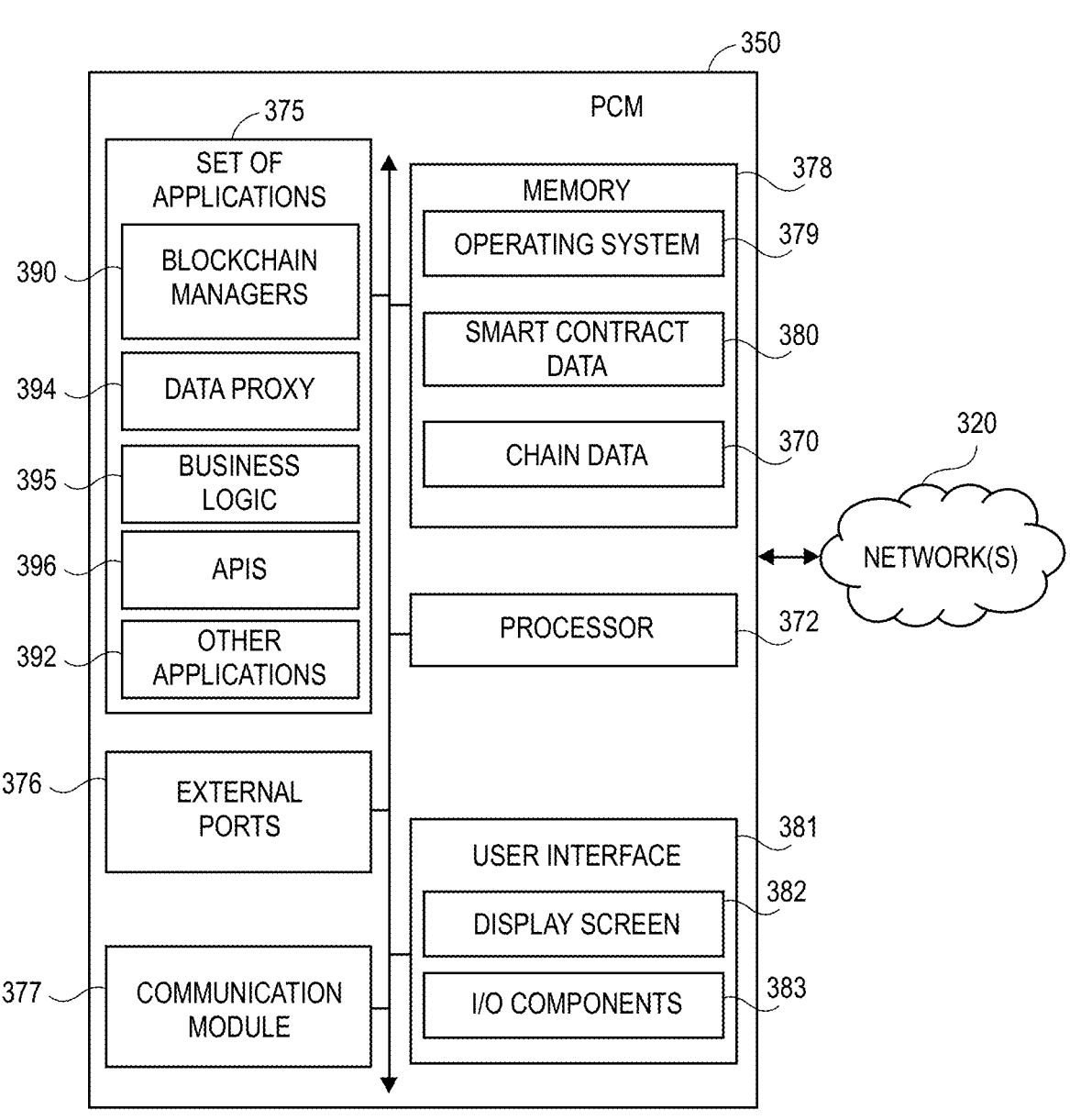
FIG. 3 is a hardware diagram depicting an example server and an example node computer, in accordance with some embodiments.

FIG. 3 illustrates a hardware diagram of an example process compliance monitor (PCM) 350 (such as the PCM 130 as discussed with respect to FIGS. 1 and 2) in which the functionalities as discussed herein may be implemented. Although a PCM 350 is depicted in FIG. 3, it should be appreciated that multiple PCM 350 may be implemented in a single embodiment.

The PCM 350 may include a processor 372 as well as a memory 378. The memory 378 may store an operating system 379 capable of facilitating the functionalities as discussed herein as well as a set of applications 375 (i.e., machine readable instructions). For example, the set of applications 375 may include blockchain managers 390 configured to facilitate smart contract transactions between and among the nodes of a blockchain network. As discussed herein, the PCM 350 may be a node of both a private blockchain that fulfills data requests and a public blockchain (such as the public blockchain 135 as discussed with respect to FIGS. 1-2) on which audit and/or compliance data is maintained. The blockchain managers 390 may include a first manager for interacting with the private blockchain network and a second manager for interacting with the public blockchain network.

The set of applications 375 may also include a data proxy 394 (such as the data proxy 132 as discussed with respect to FIGS. 1-2) that acts as a proxy between end-user devices and a data service (such as the data service 140 as discussed with respect to FIGS. 1-2) and a set of business logic 395 (such as the business logic 138 as discussed with respect to FIGS. 1-2) that defines authorization and/or authentication processes discussed herein. The set of applications 375 may also include one or more application programming interfaces (APIs) 396 (such as the APIs 133 and 137 as discussed with respect to FIGS. 1-2) via which external devices invoke the functionality of the PCM 350 described herein. It should be appreciated that one or more other applications 392 are envisioned.

The processor 372 may interface with the memory 378 to execute the operating system 379 and the set of applications 375. According to some embodiments, the memory 378 may also include smart contract data 380 associated with the smart contract transactions and chain data 370 associated with the distributed ledger. In some embodiments, portions of the smart contract data are synchronized with the business logic 395. The memory 378 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The PCM 350 may further include a communication module 377 configured to communicate data via one or more networks 310. According to some embodiments, the communication module 377 may include one or more transceivers (e.g., WWAN, WLAN, and/or WPAN transceivers) functioning in accordance with IEEE standards, 3GPP standards, or other standards, and configured to receive and transmit data via one or more external ports 376. For example, the communication module 377 may communicate with a data service or end-user devices (such as the actor device 105 or custodian/auditor device 107 as discussed with respect to FIGS. 1-2) via the network(s) 310.

The PCM 350 may further include a user interface 381 configured to present information to a user and/or receive inputs from the user. As shown in FIG. 3, the user interface 381 may include a display screen 382 and I/O components 383 (e.g., ports, capacitive or resistive touch sensitive input panels, keys, buttons, lights, LEDs). According to some embodiments, operators may access the PCM 350 via the user interface 381 to review information, make selections, update applications in the set of applications 375 and/or the OS 379, and/or perform other functions.

In some embodiments, the PCM 350 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 372 (e.g., working in connection with the respective operating systems 379) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Figure 4:
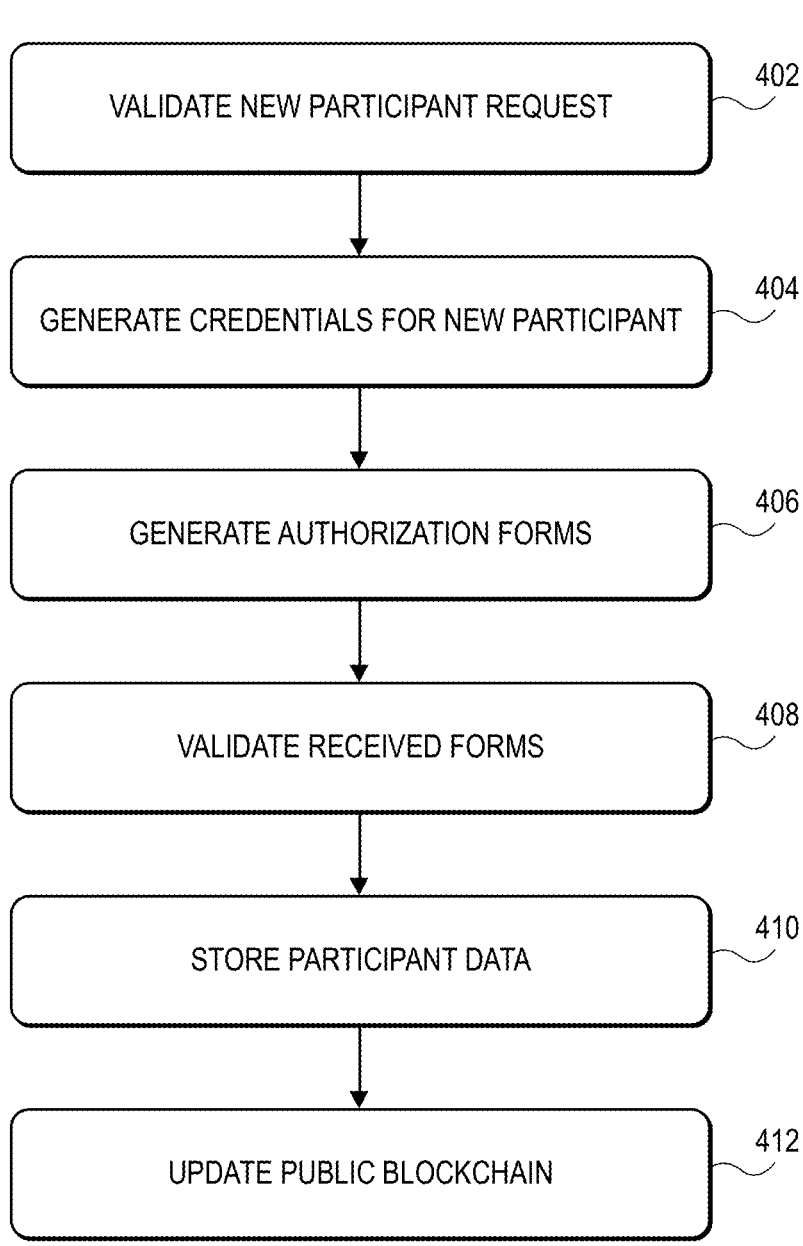
FIG. 4 is a flow diagram associated with enabling access to a participant registering with a compliance management system, in accordance with some embodiments.

FIG. 4 is a block diagram of an example method 400 of enabling access to a participant registering with a compliance management system (such as the system 100 as described with respect to FIGS. 1-3). For example, the participant may be a patient registering with an electronic medical record (EMR) system that enable the patient to control access to their EMR as they switch between healthcare providers and/or networks. Accordingly, the participant may use an electronic device (such as the actor device 105 as described with respect to FIGS. 1-3) to send a registration request to the compliance management system. Alternatively, a healthcare provider that is enrolled with the access rights system may submit a request on behalf of the patient. In some embodiments, upon receiving the request, the compliance management system creates a smart contract transaction on a private blockchain (such as the private blockchain as described with respect to FIGS. 1-3) for processing the new patient request. In these embodiments, the smart contract transaction may provide the computer executable instructions that controls the components of the compliance management system (such as the PCM 130 or 350 as described with respect to FIGS. 1-3) to perform the actions of the method 400.

At block 402, the compliance management system validates the received request from the patient. For example, as part of the registration request, the patient may provide a variety of information, such as biographical information, medical information, and so on. Accordingly, the verification may involve verifying the patient's biographical information matches other records maintained by the HCP. In embodiments where the request is submitted by the HCP, the compliance management system may authenticate the HCP. For example, the HCP may include an authentication token with the new patient request. In response, the access rights system may validate the provided authentication token using an authentication module (such as the authentication module 110 as described with respect to FIGS. 1-2).

At block 404, the compliance management system creates credentials for the patient. For example, the authentication module may generate a new authentication token for the patient and provide the generated authentication token to the HCP and/or patient to use when interacting with the compliance management system.

At block 406, the access rights system generates a set of forms for the patient to authorize access to their EMRs. The forms may include fields that enable the patient to authorize the HCP, another HCP, a family member, or any other person or entity registered with the compliance management system to access their EMRs and/or identified portions thereof. For example, the forms may enable the patient to authorize their primary care provider to view their complete EMRs and a specialist to view only the EMRs associated with the doctor's visit that led to referral to the specialist. In some embodiments, the authorization provided by the patient is limited in time (e.g., for the next week or month). According to aspects, the form may be presented and filled out via a portal or application on the patient or HCP device, or it may be presented as an image that is printed out and scanned into the compliance management system upon completion.

At block 408, the compliance management system validates the completed forms. For example, the compliance management system may verify that fields of the form contain valid data for the respective field. As another example, the patient may include their newly generated authentication token when submitting their forms. Accordingly, the compliance management system may validate the authentication token to confirm that the forms were in fact provided by the patient (or at their direction).

At block 410, the compliance management system stores data associated with the patient. In some embodiments, the data is stored at a data service (such as the data service 140 as described with respect to FIGS. 1-3). Accordingly, the compliance management system may invoke an API of the data service to store the data therewith. The stored data may include the biographical information of the patient to establish a record with the data service. Additionally, the stored data may include an EMR associated with a current visit to an HCP.

At block 412, the compliance management system records a transaction to a public blockchain (such as the public blockchain 135 as described with respect to FIGS. 1-2). The transaction may include an indication of the type of data transaction (e.g., storing data), an indication of the patient, an indication of the HCP that provided the stored EMR, a data/time of the data storage request, and/or other data useful to an auditor in assessing compliance of the data transaction.

Figure 5:
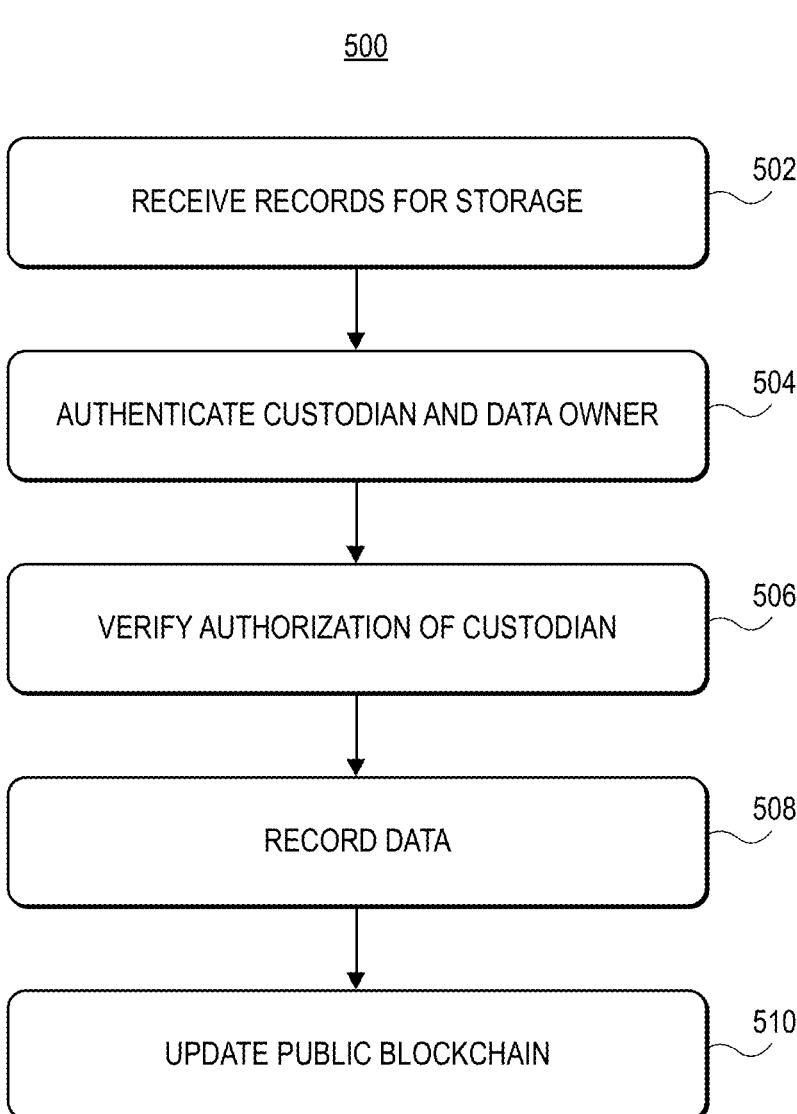
FIG. 5 is a flow diagram associated with a data custodian storing data associated with a data owner via a compliance management system, in accordance with some embodiments.

FIG. 5 is a block diagram of an example method 500 of a data custodian (such as an HCP) storing data associated with a data owner (such as a patient) via a compliance management system (such as the system 100 as described with respect to FIGS. 1-4). For example, the HCP may be storing a new electronic medical record (EMR) with a data service (such as the data service 140 as described with respect to FIGS. 1-4) based upon a current or recent patient visit. Accordingly, the HCP may use an electronic device (such as the custodian device 107 as described with respect to FIGS. 1-4) to generate and submit an EMR regarding the patient.

At block 502, the compliance management system receives the request to store an EMR for a patient. In some embodiments, upon receiving the EMR, the compliance management system creates a smart contract transaction on a private blockchain (such as the private blockchain as described with respect to FIGS. 1-2) for processing the EMR storage request. In these embodiments, the smart contract transaction may provide the computer executable instructions that controls the components of the compliance management system (such as the PCM 130 or 350 as described with respect to FIGS. 1-3) to perform actions of the method 500.

At block 504, the compliance management system authenticates the HCP and patient identity. To authenticate the HCP, the HCP may append the request with an authentication token assigned to them via an authentication module (such as the authentication module 110 as described with respect to FIGS. 1-2). Accordingly, the compliance management system may validate the authentication token of the HCP with the authentication module to validate that the EMR is indeed being submitted by the HCP.

In some embodiments, the patient provides an indication of their authentication token to the HCP. For example, the patient may attach a copy of their token to an authorization form for storing the EMR for the visit. In some embodiments, the patient device may interact with the authentication module to generate a new authentication token to use for the instant visit. In other embodiments, the patient may provide a different patient identifier that the data access rights system uses to query an identity manager to obtain a temporary patient authentication token. In still other embodiments, the patient provides a revocable copy of an authentication token that the HCP stores in a data vault. Regardless of how it is received, the compliance management system may validate the received patient authentication token with the authentication module.

At block 506, the compliance management system verifies the request to store the EMR is authorized. As described herein, the patient may define and store a set of access restrictions and/or rights via an access rights system (such as the access rights system 120 as described with respect to FIGS. 1-4). Accordingly, the compliance management system may verify the authenticated HCP has been given rights to store data regarding the authenticated patient by querying the access rights system.

At block 508, the compliance management system stores the patient data. More particularly, the compliance system generates a data request with the data service to store the EMR at a record associated with the patient.

At block 510, the compliance management system records a transaction to a public blockchain (such as the public blockchain 135 as described with respect to FIGS. 1-4). The transaction may include an indication of the type of data transaction (e.g., storing data), an indication of the patient, an indication of the HCP that provided the stored EMR, a data/time of the data storage request, and/or other data useful to an auditor in assessing compliance of the data transaction.

It should be appreciated that the method 500 sets out the actions that are performed by the compliance management system when the parties are authenticated and the HCP is authorized to store the data. However, if the patient or the HCP are not authenticated (e.g., when the authentication tokens are missing or are not validated by the authentication module), the compliance management system may instead record a transaction to the public blockchain indicating that the compliance management system received a data storage request where the data owner and/or the data custodian could not be authenticated. Similarly, if the HCP was not authorized to store EMR on behalf of the patient (e.g., the access rights system does not provide the HCP a right to store data on behalf of the patient), the compliance management system may record a transaction to the public blockchain indicating that the compliance management system received an unauthorized data storage request. In some embodiments, prior to recording a transaction indicating an unauthorized request, the compliance management system may issue a prompt or alert to a patient device to provide authorization for the pending data request. When recording the transaction indicating a non-compliance event, the transaction may indicate the type of non-compliance event (an unauthenticated party, an unauthorized request, etc.), an identity of the requestor, an identity of the data owner, a time of the request, and/or other data useful to an auditor in assessing compliance of the data transaction.

Figure 6:
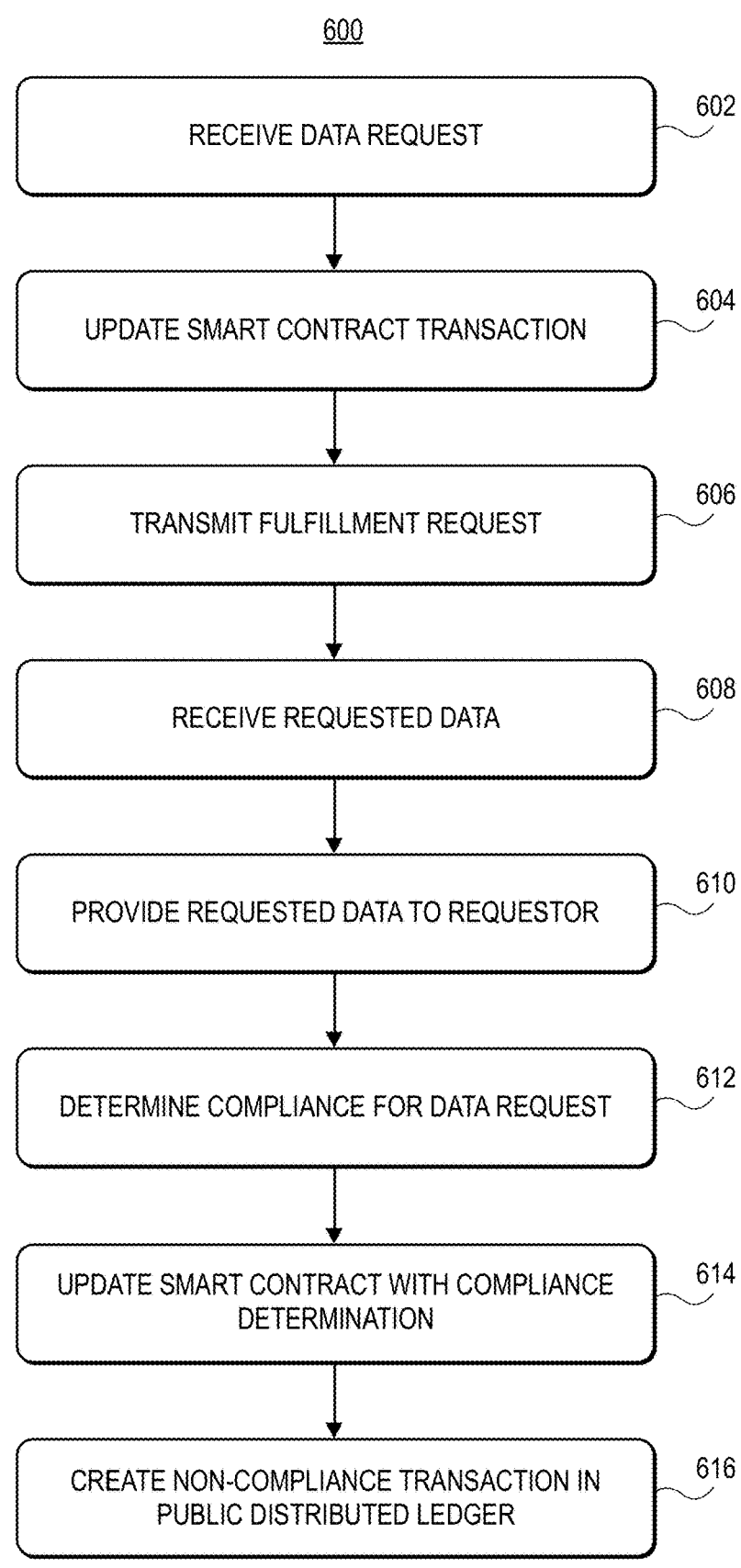
FIG. 6 is a flow diagram associated with associated with auditing access to a data service associated with a set of access restrictions, in accordance with some embodiments

FIG. 6 is a block diagram of an example method 600 of auditing access to a data service (such as the data service 140 described with respect to FIGS. 1-5) associated with a set of access restrictions. The method 600 may be facilitated by a process compliance monitor (PCM) (such as the PCM 130 and 350 described with respect to FIGS. 1-5). As described herein, the PCM may be a node of a private distributed ledger that is (i) maintained by a first plurality of node computers and (ii) controlling access to the data service and a public distributed leger (such as the public blockchain 135 as described with respect to FIGS. 1-5) that is (a) maintained by a second plurality of node computers and (b) associated with a log of access to the data service. It should be appreciated that the various request transmitted and received by the PCM may be formatted in compliance with an API of the receiving component.

The method 600 begins when the PCM receives, from a requestor, a data request to access requested data maintained by the data service. The data request may include an indication of the requestor of the data request. For example, the requestor may be a HCP submitting a data request to access patient EMR or an employee requesting access to research and development or other types of confidential company data.

At block 604, after receiving the data request, the PCM may create and/or update a smart contract transaction in the private distributed ledger, the smart contract transaction associated with the data request. For example, in some embodiments, in response to receiving the data request, the PCM creates a new smart contract transaction in the private distributed ledger to process and determine compliance of the data request. Accordingly, updating the smart contract transaction may include creating the smart contract transaction and including initial information (indication of requestor, indication of data owner, time/date, etc.) associated with the received data request.

The PCM or another component of the compliance management system (such as the access rights system described with respect to FIGS. 1-5) may also have previously created a smart contract transaction on the private distributed ledger. For example, prior to receiving the data request from the requestor, the PCM may receive, from the data owner, permission request indicating the requestor may access the requested data. After receiving the permission request, the PCM may create a permission smart contract transaction in the private distributed ledger associated with the permission request. Accordingly, the PCM may additionally or alternatively update the permission request smart contract transaction to indicate the initial information associated with the received data request.

At block 606, the PCM may transmit a fulfillment request to the data service. More particularly, the PCM may create a fulfillment request formatted in accordance with an API of the data service that requests the data indicated in the received data request. At block 608, the PCM receives the requested data from the data service.

At block 610, the PCM provides the requested data to the requestor. More particularly, the PCM provides the data received from the data service to the requestor.

At block 612, the PCM determines whether the data request complies with the set of access restrictions of the data service. That is, the PCM determines that access was not provided to any non-authenticated and/or unauthorized requestors and that data requests by authenticated and authorized requestors were not inappropriately rejected. It should be appreciated that for data requests that were inappropriately rejected, the PCM may not perform the actions associated with blocks 606-612. In some embodiments, the data request includes one or more authentication tokens to authenticate the requestor and/or the data owner of the requested data. Accordingly, determining the compliance with the set of access restrictions may include validating the received authentication tokens and/or that an authentication token was received at all. In some embodiments, validation occurs by the PCM in conjunction with an authenticator (such as the authentication module 110 as described with respect to FIGS. 1-5). For example, the PCM may perform an action associated with a data request smart contract which causes the authenticator node to perform the validation. In other embodiments, the PCM may itself determine the validity of the authentication token. For example, if the authentication token is associated with a public-private key pair, the smart contract transaction may store the public key for the requestor and/or the data owner and the authentication token may be generated based upon an application of the requestor or data owner's private key. Accordingly, the PCM may obtain the relevant public keys from the smart contract transaction to determine whether the authentication tokens are properly decrypted when the public key is applied thereto. If the authentication tokens are not valid, the PCM may determine that the data request does not comply with the set of access restrictions.

In some embodiments, when the data owner has submitted a permission request, the permission request may indicate a time window for access. Accordingly, the PCM may cause the authenticator to generate an authentication token, create a permission request smart contract transaction, and transmit the authentication token to the requestor. At the expiration of the time window, the PCM (or other node of the private distributed ledger) may revoke the authentication token. For example, the PCM may update the permission request smart contract transaction on the private distributed ledger to remove the authentication token upon the expiration of the time window. Thus, to determine whether the data request complies with the set of access restrictions, the PCM may determine whether the permission request smart contract includes an indication of the authentication token.

At block 614, the PCM updates the smart contract transaction to indicate a status of the fulfillment request and the determination of whether the data request complies with the set of access restrictions. With respect to the status, if the PCM received data from the data service at block 608 and provided it to the requestor at block 610, the status may indicate the data request was fulfilled. On the other hand, if an error occurred and the data service was unable to return the requested data at block 608, the status may indicate the corresponding error. With respect to the compliance with the set of access restrictions, the PCM may include an indication of the determination performed at block 612. For example, the indication may include an indication of the compliance determination, an indication of a type of non-compliance event, an indication of the requestor, an indication of the data owner, an indication of the requested data, and/or an indication of a time/date of the data request.

At block 616, in response to determining that the data request does not comply with the set of access restrictions, the PCM creates a non-compliance transaction in the public distributed ledger. Similar to the updating of the smart contract transaction on the private distributed ledger, the non-compliance transaction may include an indication of the compliance determination, an indication of a type of non-compliance event, an indication of the requestor, an indication of the data owner, an indication of the requested data, and/or an indication of a time/date of the data request. In some embodiments, the PCM may also create a compliance transaction if the data request did comply with the set of access restrictions.

It should be appreciated that in some embodiments, a non-compliance event may occur when there is no data request received by the PCM. For example, a non-compliance event may occur when the time window of a permission request smart contract transaction expires without receiving a request from an indicated requestor (still referred to herein as a "requestor" even though this requestor has not, in fact, submitted a request). Accordingly, when the PCM determines that no data request was received from the requestor within the time window indicated by the permissions request smart contract transaction, the PCM may create a non-compliance transaction on the public distributed ledger.

It should be appreciated that in some embodiments, the steps of the method 600 are performed in a different order. For example, the compliance determination of block 612 may be performed prior to providing the requested data to the requestor at block 610. In these embodiments, if the data request is not compliant with the set of access restrictions, the PCM may only provide the requested data to the requestor in response to determining that the data request complies with the set of access restrictions. That is, the PCM may refrain from providing the requested data to the requestor if the data request does not comply with the set of access restrictions.

Figure 7:
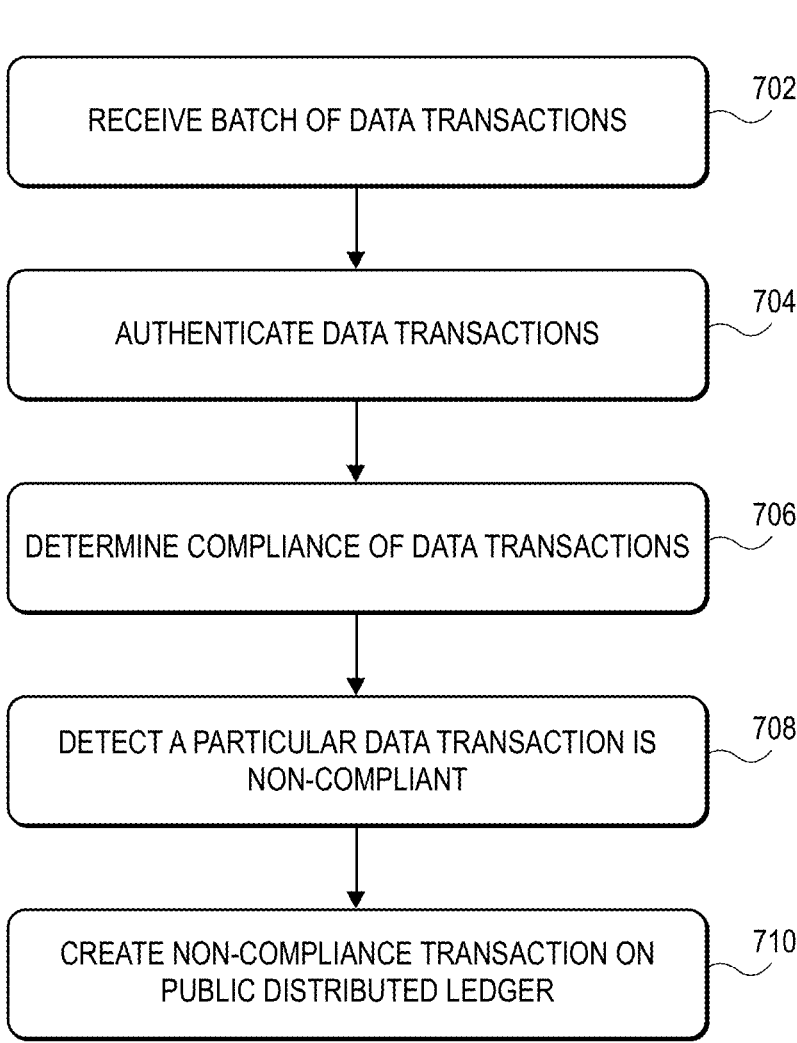
FIG. 7 is a flow diagram associated with auditing access to a data service associated with a set of access restrictions, in accordance with some embodiments.

FIG. 7 is a block diagram of an example method 700 of auditing access to a data service (such as the data service 140 described with respect to FIGS. 1-6) associated with a set of access restrictions. The method 700 may be facilitated by a process compliance monitor (PCM) (such as the PCM 130 and 350 described with respect to FIGS. 1-6). As described herein, the PCM may be a node of a private distributed ledger that is (i) maintained by a first plurality of node computers and (ii) controlling access to the data service and a public distributed leger (such as the public blockchain 135 as described with respect to FIGS. 1-6) that is (a) maintained by a second plurality of node computers and (b) associated with a log of access to the data service. It should be appreciated that the various request transmitted and received by the PCM may be formatted in compliance with an API of the receiving component.

The method 700 begins at block 702 when the PCM receives a batch of data transactions associated with a plurality of data requests for requested data maintained by a data service. In some embodiments, the data service may be configured to periodically send batches of data transactions to the PCM. To this end, the PCM may periodically send the data service a batch request message for any data transactions that have not yet been received by the PCM. In some embodiments, the data transactions correspond to data requests that are recorded to the private distributed ledger.

At block 704, the PCM authenticates the data transactions within the batch of data transactions. As described herein, the data service may utilize a different credentialing system for users that the compliance management system and/or the blockchain management applications thereof. Accordingly, to authenticate the data transactions, the PCM may associate an identity associated with the data transaction to a corresponding identity maintained by a blockchain manager. To this end, an authenticator (such as the authentication module 110 as described with respect to FIGS. 1-6) may store a plurality of data records for participants of the compliance management system with their corresponding identities with the data service. Accordingly, the PCM may query the authenticator using any identity information included in the data transactions to obtain the corresponding identity information for the compliance management system. As described herein, the authenticator may also store a plurality of authentication tokens for participants with the compliance management system. Accordingly, in response to querying the authenticator, the PCM may also obtain an authentication token associated with the identity maintained by the blockchain manager of the compliance management system.

At block 706, the PCM determines whether the data transactions within the batch of data transactions comply with the set of access restrictions of the data service. For example, the PCM may validate the authentication tokens obtained from the authenticator when authenticating the data transaction. To this end, as described herein, the private distributed ledger may store permission request smart contracts via which data owners give requestors permission to interact with their data that is maintained at the data service. Accordingly, to validate the authentication token, the PCM may identify a permission request smart contract associated with the data owner and determine that the permission request smart contract includes an indication of the obtained authentication token for the requestor.

At block 708, the PCM detects that a particular data transaction within the batch of data transactions does not comply with the set of access restrictions. That is, the PCM determines that access was not provided to any non-authenticated and/or unauthorized requestors and that data requests by authenticated and authorized requestors were not inappropriately rejected. For example, the PCM may determine that the permission request smart contract for the data owner of the particular data transaction does not include an indication of the authentication token for the requestor (or an indication of an authentication token at all).

At block 710, in response to determining that the particular data transaction does not comply with the set of access restrictions, the PCM creates a non-compliance transaction in the public distributed ledger. In some embodiments, the PCM may also create a compliance transaction in the public distributed ledger for data transactions that comply with the set of access restrictions. As described herein, the non-compliance transaction (and compliance transactions) may include an indication of the compliance determination, an indication of a type of non-compliance event, an indication of the requestor, an indication of the data owner, an indication of the requested data, and/or an indication of a time/date of the data request.

As described herein, the compliance management system enables auditors or other third parties to access compliance data maintained on the public distributed ledger. In some embodiments, rather than requiring the auditors to perform their own analyses of the public distributed ledger, the PCM analyzes the batch of data transaction to generate a compliance report. For example, PCM may generate a compliance report in response to receiving a batch of data transaction or at a longer periodic interval (e.g., the data transaction requests are sent daily, whereas the compliance reports are generated weekly). The compliance report may provide a plurality of statistics associated with compliance of the data transactions with the set of access restrictions (e.g., a percent of non-compliant transactions, an ordered list of data owners associated with non-compliant data requests, an ordered list of requestors associated with non-compliant data requests, and/or other statistics relevant to the auditors enrolled with the compliance management system).

In some embodiments, after generating the compliance report, the PCM obtains a compliance report subscriber list associated with the public distributed ledger. In some embodiments, a block of the private distributed ledger stores the subscriber list and the corresponding network addresses at which the subscriber indicated the compliance report should be received. Accordingly, the PCM may transmit the compliance report to the subscriber devices associated with the subscriber list.

In other embodiments, the PCM stores the compliance report on the public distributed ledger. For example, the PCM may create a compliance report smart contract transaction on the public distributed ledger. The PCM may then include indications of the authentication tokens for subscribers in the subscriber list in the compliance report smart contract transaction. Accordingly, auditors that wish to access the compliance report can use their authentication token to access the compliance report associated with the compliance report smart contract transactions. In this embodiment, third parties with authentication tokens not included in the compliance report smart contract transaction and/or auditors with authentication tokens that could not be validated (e.g., via the authenticator) cannot access the compliance reports.

It should be appreciated that while the foregoing description of the methods 600 and 700 describe the PCM as performing the corresponding steps, in some embodiments, another node of the compliance management system (e.g., an access rights system such as the access rights system 120 described with respect to FIGS. 1-7) may perform some actions at the direction and control of the PCM, for example, by the PCM creating a smart contract transaction on the private distributed ledger. Additionally, while the PCM is generally referred to as a single node, in some implementations, the PCM may be composed of any number of nodes processing a plurality of data request transactions in a coordinated manner. Accordingly, in some embodiments, a first node of the PCM may perform a first set of actions associated with the methods 600 and 700, and a second node of the PCM may perform a second set of actions associated with the method 600 and 700. Accordingly, in these embodiments, references to one or more processors of the PCM includes the processors that are included in each node of the PCM that performs a step of the methods 600 and 700.

Although the following text sets forth a detailed description of numerous different embodiments, it should be understood that the legal scope of the systems and methods may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise. This detailed description is to be construed as examples and does not describe every possible embodiment, as describing every possible embodiment would be impractical.

What is claimed is:

1. A system for auditing access to a data service, the system comprising:

a transceiver for communicating with a plurality of node computers;

a memory storing a set of computer-executable instructions; and a processor interfacing with the transceiver and the memory, and configured to execute the set of computer-executable instructions to cause the processor to:

receive a batch of data transactions associated with a plurality of data requests for data maintained by a data service, wherein:

the data service is associated with a set of access restrictions using a private distributed ledger (i) maintained by a first plurality of node computers and (ii) controlling access to the data service and a public distributed ledger (a) maintained by a second plurality of node computers and (b) associated with a log of access to the data service, and the plurality of data requests are recorded to the private distributed ledger;

authenticate data transactions within the batch of data transactions;

determine whether the data transactions within the batch of data transactions comply with the set of access restrictions of the data service;

detect that a particular data transaction within the batch of data transactions does not comply with the set of access restrictions; and in response to determining that the particular data transaction does not comply with the set of access restrictions, create a non-compliance transaction in the public distributed ledger.

2. The system of claim 1, wherein to authenticate the data transactions comprises instructions that, when executed by the processor, cause the processor to:

associate an identity associated with each data transaction the data transactions to a corresponding identity maintained by a blockchain manager; and obtain an authentication token associated with the identity maintained by the blockchain manager.

3. The system of claim 2, wherein to determine whether a data transaction in the batch of data transactions comply with the set of access restrictions comprises instructions that, when executed by the processor, cause the processor to:

validate the obtained authentication token.

4. The system of claim 3, wherein to validate the obtained authentication token comprises instructions that, when executed by the processor, cause the processor to:

determine a permissions request smart contract on the private distributed ledger includes an indication of the obtained authentication token.

5. The system of claim 1, further comprising instructions that, when executed by the processor, cause the processor to:

in response to determining that a data transaction complies with the set of access restrictions, create a compliance transaction in the public distributed ledger.

6. The system of claim 5, wherein the compliance transaction indicates one or more of: a compliance determination, a type of non-compliance event, a requestor, a data owner, the data of a data request, a time of the data request, or a date of the data request.

7. The system of claim 1, further comprising instructions that, when executed by the processor, cause the processor to:

analyze the batch of data transactions to generate a compliance report.

8. The system of claim 7, further comprises instructions that, when executed by the processor, cause the processor to:

obtain a subscriber list associated with the public distributed ledger; and transmit the compliance report to subscriber devices associated with the subscriber list.

9. The system of claim 7, further comprising instructions that, when executed by the processor, cause the processor to:

store, on the public distributed ledger, the generated compliance report.

10. The system of claim 9, wherein to store the generated compliance on the public distributed ledger comprises instructions that, when executed by the processor, cause the processor to:

generate a compliance report smart contract transaction; and update the compliance report smart contract transaction with a set of authentication tokens for subscriber devices included in a subscriber list associated with the public distributed ledger.

11. A computer-implemented method of auditing access to a data service, the computer-implemented method comprising:

receiving, by one or more processors, a batch of data transactions associated with a plurality of data requests for data maintained by a data service, wherein:

the data service is associated with a set of access restrictions using a private distributed ledger (i) maintained by a first plurality of node computers and (ii) controlling access to the data service and a public distributed ledger (a) maintained by a second plurality of node computers and (b) associated with a log of access to the data service, and the plurality of data requests are recorded to the private distributed ledger;

authenticating, by the one or more processors, data transactions within the batch of data transactions;

determining, by the one or more processors, whether the data transactions within the batch of data transactions comply with the set of access restrictions of the data service;

detecting, by the one or more processors, that a particular data transaction within the batch of data transactions does not comply with the set of access restrictions; and in response to determining that the particular data transaction does not comply with the set of access restrictions, creating, by the one or more processors, a non-compliance transaction in the public distributed ledger.

12. The computer-implemented method of claim 11, wherein authenticating the data transactions comprises:

associating, by the one or more processors, an identity associated with each data transaction the data transactions to a corresponding identity maintained by a blockchain manager; and obtaining, by the one or more processors, an authentication token associated with the identity maintained by the blockchain manager.

13. The computer-implemented method of claim 12, wherein determining whether a data transaction in the batch of data transactions comply with the set of access restrictions comprises:

validating, by the one or more processors, the obtained authentication token.

14. The computer-implemented method of claim 13, wherein validating the obtained authentication token comprises:

determining, by the one or more processors, a permissions request smart contract on the private distributed ledger includes an indication of the obtained authentication token.

15. The computer-implemented method of claim 11, further comprising:

in response to determining that a data transaction complies with the set of access restrictions, creating, by the one or more processors, a compliance transaction in the public distributed ledger.

16. The computer-implemented method of claim 15, wherein the compliance transaction indicates one or more of: a compliance determination, a type of non-compliance event, a requestor, a data owner, the data of a data request, a time of the data request, or a date of the data request.

17. The computer-implemented method of claim 11, further comprising:

analyzing, by the one or more processors, the batch of data transactions to generate a compliance report.

18. The computer-implemented method of claim 17, further comprising:

obtaining, by the one or more processors, a subscriber list associated with the public distributed ledger; and transmitting, by the one or more processors, the compliance report to subscriber devices associated with the subscriber list.

19. The computer-implemented method of claim 17, wherein generating the compliance on the public distributed ledger comprises:

generating, by the one or more processors, a compliance report smart contract transaction; and updating, by the one or more processors, the compliance report smart contract transaction with a set of authentication tokens for subscriber devices included in a subscriber list associated with the public distributed ledger.

20. A non-transitory computer readable medium having computer-executable instructions stored thereon that, when executed by one or more processors, cause the one or more processors to:

receive a batch of data transactions associated with a plurality of data requests for data maintained by a data service, wherein:

the data service is associated with a set of access restrictions using a private distributed ledger (i) maintained by a first plurality of node computers and (ii) controlling access to the data service and a public distributed ledger (a) maintained by a second plurality of node computers and (b) associated with a log of access to the data service, and the plurality of data requests are recorded to the private distributed ledger;

authenticate data transactions within the batch of data transactions;

determine whether the data transactions within the batch of data transactions comply with the set of access restrictions of the data service;

detect that a particular data transaction within the batch of data transactions does not comply with the set of access restrictions; and in response to determining that the particular data transaction does not comply with the set of access restrictions, create a non-compliance transaction in the public distributed ledger.

\* \* \* \* \*